United States Patent [19]

Eikelboom

[11] Patent Number: 4,495,555
[45] Date of Patent: Jan. 22, 1985

[54] ENERGY CONVERTER

[75] Inventor: Lucas Eikelboom, Haaksbergen, Netherlands

[73] Assignee: Hollandse Signaalapparaten B.V., Hengelo, Netherlands

[21] Appl. No.: 398,175

[22] Filed: Jul. 14, 1982

[30] Foreign Application Priority Data

Jul. 23, 1981 [NL] Netherlands .................. 8103475

[51] Int. Cl.³ .......................................... H02M 3/315
[52] U.S. Cl. ....................................... 323/28; 363/96; 363/136
[58] Field of Search .................. 363/27–28, 363/57–58, 96, 135–138

[56] References Cited

U.S. PATENT DOCUMENTS 3,343,068  9/1967  Studtmann et al. ............ 363/137 X
4,333,135  6/1982  Schwarz ............................... 363/28

OTHER PUBLICATIONS

S. Lindena, "Pulse-Width Modulated Series Inverter with Inductor-Transformer in Low Power Applications", PCSC-1971 Record, Pasadena, Calif., USA, (19-20 Apr. 1971), pp. 86-93.

Primary Examiner—Peter S. Wong
Attorney, Agent, or Firm—Robert T. Mayer; Bernard Franzblau

[57] ABSTRACT

An energy converter comprising a series-resonant bridge circuit (1) tuned to a constant frequency. A number of parallel-connected output transformers (2, 3) are accommodated in the bridge circuit and energy buffers (6, 7) are coupled to the secondary winding of each of the output transformers. By means of control circuits (23, 24) activated by the voltage across the different energy buffers the current through the primary winding of a relevant output transformer is controlled so that the voltage across the corresponding energy buffer remains constant.

9 Claims, 8 Drawing Figures

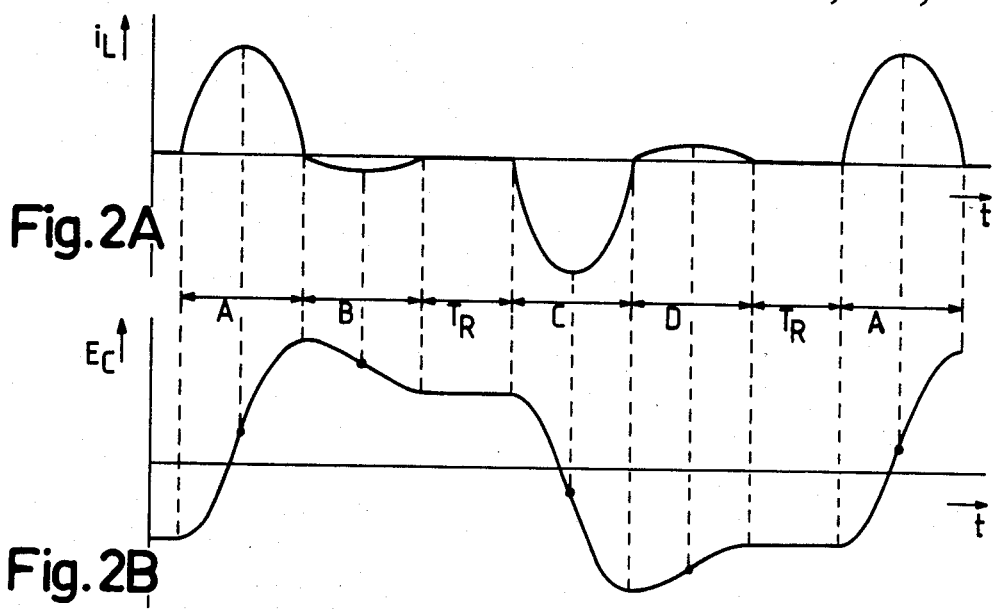
Fig. 2A
Fig. 2B
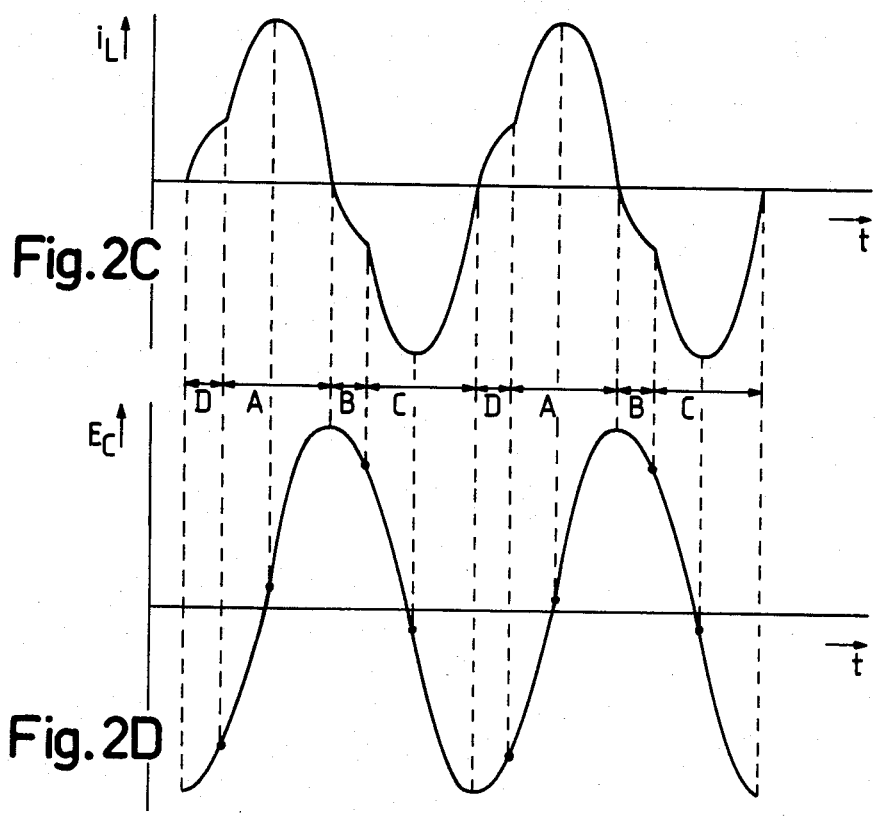
Fig. 2C
Fig. 2D

ENERGY CONVERTER

The invention relates to an energy converter for converting electrical energy from a single phase or a polyphase AC source or from a DC source into electrical energy with a single phase or a polyphase AC voltage of a different amplitude and/or frequency, or into a pulsating voltage, or a DC voltage. Energy converters ideally suited for this purpose are of the type utilising a bridge circuit containing at least two thyristors and a series resonant circuit, of which the series resonant circuit includes a high frequency output transformer having a secondary winding coupled to an energy buffer. With the relevant thyristors of the bridge circuit in the conducting state, energy from the source is supplied to the energy buffer via the series resonant circuit, and energy is extracted from the buffer by the load. During the time the thyristors are not in the conducting state, the energy supplied to the buffer may be returned to the source or extracted by the load. The energy balance setting is determined by the times at which the thyristors of the bridge circuit are triggered. An energy converter of the above type is disclosed, for example, in the U.S. Pat. No. 3,953,779. In this patent the energy converter comprises an analogue control circuit. This circuit responds, among others, to a voltage derived from the output voltage of the output transformer and delivers trigger pulses to bring the appropriate thyristors into the conducting state. Depending on the current drawn by the load, that is depending on the voltage across the energy buffer, the trigger frequency of the thyristors changes. Such a control voltage is not applicable, however, in the event several loads are to draw current from the bridge circuit. The present invention has for its object to provide an energy converter of the type referred to above which will obviate the disadvantages incurred with the absence of a trigger timing for the thyristors.

The invention provides an energy converter comprising the following elements: a bridge circuit tuned to a constant frequency and provided with at least two thyristors and a series resonant circuit; a number of parallel connected output transformers accommodated in the series resonant circuit; and energy buffers coupled to the secondary winding of each of the output transformers, through which elements energy is supplied from a source to a number of loads which equals the number of output transformers, and further comprising control circuits activated by the voltage across the different energy buffers, each of which control circuits control the current through the primary winding of the relevant output transformer in such a way that the voltage across the corresponding energy buffer remains constant.

The trigger frequency of the thyristors is constant and is, unlike before, independent of the voltage across the energy buffer. For each of the energy buffers the energy balance is set separately by a special control circuit.

The invention will now be described with reference to the accompanying drawing, in which:

FIGS. 2A, 2B, 2C and 2D are diagrams useful in explaining the operation of the bridge circuit.

Figure 1:
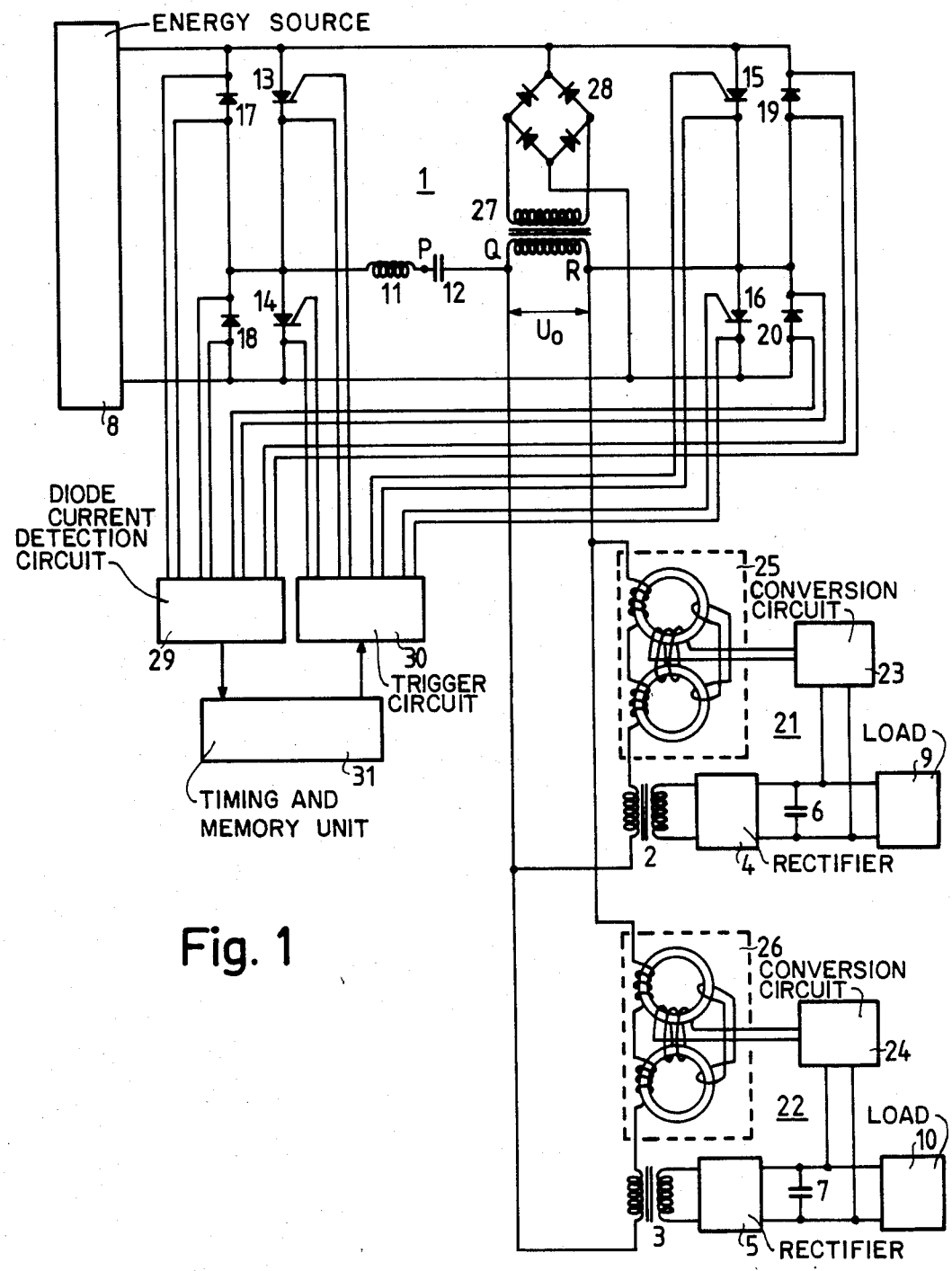
FIG. 1 is an embodiment of the energy converter with a double load connected in parallel according to the invention.

The energy converter of FIG. 1 comprises a bridge circuit 1, parallel-connected output transformers 2 and 3, rectifiers 4 and 5, and energy buffers 6 and 7. Energy from a source 8 is supplied to a load 9 via the bridge circuit 1, the output transformer 2, the rectifier 4 and the energy buffer 6. Energy from the source 8 is supplied to a load 10 via the bridge circuit 1, the output transformer 3, the rectifier 5 and the energy buffer 7. The bridge circuit comprises a series resonant circuit consisting of a coil 11 and a capacitor 12, four thyristors 13, 14, 15 and 16 and diodes 17, 18, 19 and 20, antiparallel connected to the thyristors. The operation of such a series resonant bridge circuit is known and disclosed in IEEE Transactions on Industrial Electronics and Control Instrumentation, Vol. IECI-17, No. 3, May 1970, pp. 209–221 and Vol. IECI-23, No. 2, May 1976, pp. 142–149 and in the cited U.S. Pat. No. 3,953,779.

FIG. 2A shows the current $i_L$ flowing through coil 11 and FIG. 2B the voltage $E_C$ across points P and Q. In phase A (thyristor phase) the thyristors 13 and 16 are in the conducting state. The current $i_L$ increases in the first instance and causes the voltage $E_C$ to rise, whereupon current $i_L$ decreases to zero. The voltage $E_C$ then reaches its maximum value. As soon as the current $i_L$ is zero, thyristors 13 and 16 no longer conduct and a reverse current starts to flow through diodes 17 and 20. Phase B (diode phase) is then entered in which the voltage $E_C$ decreases slightly because of the reverse current. When this diode current is finally zero, voltage $E_C$ remains constant until thyristors 14 and 15 are brought into the conducting state. In the thyristor phase C and the subsequent diode phase D the current $i_L$ equals that in phases A and B but flows in the opposite direction, while the voltage $E_C$ is equal to that in phases A and B but is of opposite polarity. FIG. 2C shows the current $i_L$ through coil 11 and FIG. 2D the voltage $E_C$ across points P and Q for the case where the thyristors are brought into the conducting phase already in the diode phases. This situation is designated the "indented mode", while that of FIGS. 2A and 2B is termed the "trigger mode".

In phases A and C, energy from source 8 is supplied to energy buffers 6 and 7, while the loads 9 and 10 extract the energy from the buffers. In phases B and D a part of the energy supplied to the buffers is returned to the source via the series resonant circuit and a part is extracted by loads 9 and 10. In contrast to the case of energizing a single load, a multiple load cannot give rise to a situation where through a correct setting of the trigger times of thyristors 13, 14, 15 and 16 the amount of energy in the two buffers is kept constant. For this reason, each of the buffers 6 and 7 is provided with a separate control circuit 21 and 22 respectively.

Control circuits 21 and 22 comprise a conversion circuit 23 and 24 respectively, and a current control unit. In the embodiment of FIG. 1 the current control units consist of transducers 25 and 26. The conversion circuits 23 and 24 are used to derive from the voltage across energy buffers 6 and 7 a control current for transducers 25 and 26. By means of this control current a pulse width control of the current through the primary winding of output transformers 2 and 3 is achieved.

Figure 3A:
FIGS. 3A, 3B and 3C are diagrams useful in explaining the operation of the special control circuits.
Figure 3B:
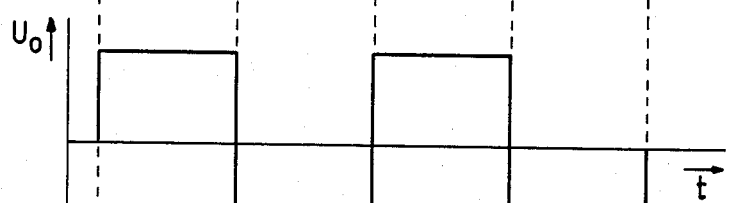
Figure 3C:
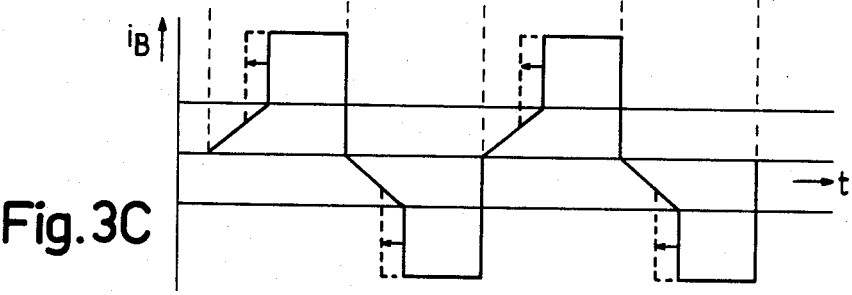

FIG. 3A again shows the current $i_L$ flowing through coil 11. This is the current supplied by the series resonant bridge circuit. FIG. 3B illustrates the voltage $U_o$ across points Q and R. FIGS. 3A and 3B illustrate how much the bridge circuit shows the character of a current source. FIG. 3C shows the variation of the current $i_B$ flowing through the load windings of one of the transducers and the primary winding of a corresponding output transformer. The relevant transducer halves are so dimensioned that they are not saturated by the current $i_B$ only. The control current supplied to a transducer determines the instant at which the two cores of the transducer will become saturated. When this occurs the transducer forms a low impedance for the current $i_B$ and the substantially complete voltage $U_o$ is impressed across the primary winding of the output transformer. With an increase in the control current the saturation level will be reached sooner, causing the leading edges of the current $i_B$ in FIG. 3C to be shifted to the left. In this way, using a transducer, a pulse width control of the current through the primary winding of an output transformer is obtained and, hence, a control of the voltage across the relevant buffer.

Since the bridge circuit behaves as a current source, difficulties arise when the current to be delivered is greater than the currents together passed through the transducers in the primary winding of the particular output transformers. In such a case, the voltage across Q and R will increase. Consequently, each of the control circuits tends to cut off further the current through the primary winding of the relevant output transformer and a still larger discrepancy arises between the magnitude of the current supplied by the bridge circuit and that of the current through the primary winding of the output transformers. Such an unstable control is accountable for the cores of the particular transducers getting continuously saturated to render the control circuits inoperative.

To avoid these difficulties, an additional output transformer 27 is incorporated. The poles of the secondary winding of this transformer are connected to the input poles of the bridge circuit via a rectifier 28. If the magnitude of the current $i_L$ supplied by the bridge circuit exceeds that of the current through the primary winding of output transformers 2 and 3, the surplus energy will be returned to the source via output transformer 27 and rectifier 28. Consequently, the bridge circuit no longer behaves as a current source but assumes that of a voltage source.

The embodiment of FIG. 1 finally comprises a diode current detection circuit 29, a thyristor trigger circuit 30 and a timing and memory unit 31.

Thyristor pairs 13, 16 and 14, 15 are triggered at a fixed frequency. The thyristor pair to be triggered and the time of triggering are controlled by the timing and memory unit 31. On receipt of the signals for the thyristor triggering from the timing and memory unit 31, the thyristor trigger circuit 30 generates the trigger pulses to bring the thyristors into the conducting state.

The diode current detection circuit 29 supplies signals indicative of the presence of current flowing through diodes 17, 20 and 18, 19. To prevent short-circuiting in the bridge circuit, the trigger pulses for thyristors 13 and 16 may not be released until it is certain that thyristors 13 and 16 are blocked.

Conversely, the trigger pulses for thyristors 14 and 15 may not be supplied until thyristors 13 and 16 are blocked. The thyristors are blocked when the diodes, connected antiparallel thereto, start conducting. The conducting state of the diodes is established by the diode current detection circuit. This circuit therefore supplies signals functioning as a condition for the release of signals to the trigger circuit 30 by the timing and memory unit 31.

I claim:

1. An energy converter for coupling a plurality of loads to a source of electric energy comprising: a bridge circuit tuned to a constant frequency and including at least two thyristors and a series resonant circuit; a plurality of parallel-connected output transformers included in the series resonant circuit; energy buffers respectively coupled to the secondary windings of each of the output transformers whereby electric energy is supplied from said source to said plurality of loads, the number of loads being equal to the number of output transformers, and a plurality of control circuits activated by the voltages across the different energy buffers, each of said control circuits controlling the current through a primary winding of a relevant output transformer such that the voltage across the corresponding energy buffer remains constant.

2. An energy converter as claimed in claim 1, wherein each of the control circuits comprises a conversion circuit and a transducer, each said conversion circuit being responsive to the voltage across a relevant energy buffer to derive a control current for its transducer, and wherein each transducer controls the pulse width of the current through the primary winding of the relevant output transformer.

3. An energy converter as claimed in claim 1, characterised in that the series resonant circuit further comprises a transformer having primary and secondary windings, means connecting said primary winding in parallel with the primary windings of said output transformers, and means connecting the secondary winding of said transformer to input terminals of the bridge circuit via a rectifier circuit.

4. A converter for coupling a source of electric energy to plural loads comprising: a series resonant bridge circuit for coupling to the energy source and including at least first and second controlled rectifiers with first and second respective diodes connected in antiparallel configurations therewith, a trigger circuit for applying trigger pulses of constant frequency to control electrodes of the first and second controlled rectifiers to alternately trigger said controlled rectifiers into conduction at a constant frequency, first and second output transformers having primary windings connected in parallel and coupled to said series resonant bridge circuit and secondary windings individually coupled to first and second respective capacitors, first and second control circuits coupled to said first and second capacitors, respectively, and responsive to the voltages on said first and second capacitors to control the current in the primary windings of said first and second output transformers, respectively, so as to maintain constant the voltages across the first and second capacitors, and means for coupling said first and second capacitors to first and second pairs of output load terminals, respectively.

5. A converter as claimed in claim 4 further comprising first and second rectifier circuits coupled between the respective secondary windings of the output transformers and the first and second capacitors and wherein the trigger circuit applies said trigger pulses to the controlled rectifiers independently of the voltages across said first and second capacitors.

6. A converter as claimed in claim 4 wherein the first and second control circuits provide pulse width control of the currents in the primary windings of said first and second output transformers with each control circuit controlling its respective primary current independently of the other control circuit.

7. A converter as claimed in claim 4 wherein the first and second control circuits control the currents in the primary windings of the first and second transformers, respectively, independently of the voltages across the second and first capacitors, respectively.

8. A converter as claimed in claim 4 wherein each control circuit comprises a voltage/current converter having an input coupled to its respective capacitor and responsive only to the voltage thereof and an output coupled to a current control unit which provides pulse width control of the current in its respective output transformer primary winding.

9. A converter as claimed in claim 4 wherein said series resonant bridge circuit includes an inductor and a capacitor connected in series circuit and further comprising a transformer having a primary winding connected in series with said inductor and capacitor and a secondary winding coupled to input terminals of the bridge circuit via a rectifier circuit so that the converter effectively operates as a voltage source.

* * * * *